United States Patent [19]

Kahlman et al.

[11] Patent Number: 5,633,851
[45] Date of Patent: May 27, 1997

[54] A SCANNING DEVICE PRODUCING A FIRST AND A SECOND SCANNING SPOT WHICH MOVE IN DIFFERENT DIRECTIONS AND AN APPARATUS CONTAINING THAT DEVICE WHICH USES THE FIRST SPOT FOR READING AND/OR RECORDING AND THE SECOND SPOT TO MONITOR SUCH READING AND/OR RECORDING

[75] Inventors: Josephus A. H. M. Kahlman; Gerard E. Van Rosmalen, both of Eindhoven, Netherlands

[73] Assignee: U.S. Philips Corporation, New York, N.Y.

[21] Appl. No.: 248,946

[22] Filed: May 25, 1994

[30] Foreign Application Priority Data

Dec. 15, 1993 [BE] Belgium ............... 09301395

[51] Int. Cl.$^6$ ............... H01J 3/14; G11B 7/20
[52] U.S. Cl. ............... 369/112; 369/44.37; 369/97; 369/119; 369/44.18; 250/236
[58] Field of Search ............... 369/111, 97, 110, 369/112, 113, 44.18, 44.32, 13, 119, 44.37, 44.22; 250/561, 236

[56] References Cited

U.S. PATENT DOCUMENTS

| | | | |
|---|---|---|---|
| 4,901,297 | 2/1990 | Komatsu et al. | 360/114 |
| 5,128,919 | 7/1992 | Narahara et al. | 369/97 |
| 5,140,566 | 8/1992 | Kang et al. | 369/13 |
| 5,157,650 | 10/1992 | Ozue et al. | 369/113 |
| 5,171,984 | 12/1992 | Van Rosmalen | 250/236 |
| 5,191,221 | 3/1993 | Van Rosmalen et al. | 250/561 |
| 5,369,631 | 11/1994 | Hwang | 369/113 |
| 5,548,114 | 8/1996 | Van Rosmalen et al. | 369/97 |

FOREIGN PATENT DOCUMENTS

0459586  12/1991  European Pat. Off.

Primary Examiner—Georgia Y. Epps
Assistant Examiner—Kim-Kwok Chu
Attorney, Agent, or Firm—Richard A. Weiss

[57] ABSTRACT

A scanning device for repeatedly scanning a scanning surface of a record carrier (e.g., a tape) by means of a first and a second scanning spot produced by respective scanning beams. The scanning spots perform synchronous movements along a first and a second scanning path, respectively, having different given scanning directions, as a result of which, the distance, viewed in a direction transverse to the scanning paths, between the first and the second scanning spot changes during scanning. The scanning device can be used in a recording and/or read apparatus which further includes a detection system for converting radiation emanating from the second scanning spot into a corresponding detection signal, and a measurement circuit which derives a position measurement signal indicative of deviation of track pitch based on a deviation in a relationship between the detection signal and a reference signal indicative of the position of the first scanning spot on the first scanning path. Other circuits can also be employed to derive a speed measurement signal indicative of the speed of the first scanning spot in a direction transverse to the track direction and a quality measurement signal indicative of the quality of an information pattern at the location of tracks traversed by the second scanning spot. If during reading a third scanning spot is used such that the second and the third scanning spot are always disposed symmetrically relative to the first scanning spot, corresponding detection signals can be obtained which can be used for deriving an inclination measurement signal indicative of the angle between the track direction and the first scanning path.

35 Claims, 6 Drawing Sheets

A SCANNING DEVICE PRODUCING A FIRST AND A SECOND SCANNING SPOT WHICH MOVE IN DIFFERENT DIRECTIONS AND AN APPARATUS CONTAINING THAT DEVICE WHICH USES THE FIRST SPOT FOR READING AND/OR RECORDING AND THE SECOND SPOT TO MONITOR SUCH READING AND/OR RECORDING

BACKGROUND OF THE INVENTION

The invention relates to a scanning device having an optical scanning system comprising a unit for repeatedly scanning a scanning surface of a record carrier by means of a first and a second scanning beam, the first and the second scanning beam forming a first and a second scanning spot on the scanning surface, which scanning spots move synchronously over the record carrier along a first and a second scanning path, respectively. The invention further relates to a recording and/or read apparatus comprising such a scanning device.

Such devices are known from U.S. Pat. No. 4,901,297. By means of the scanning device disclosed therein, the recording surface of a magneto-optical record carrier in the form of a tape, which surface corresponds to the scanning surface, is scanned by two scanning spots in a direction transverse to the longitudinal direction of the record carrier tape. In order to realise this scanning, two parallel laser beams are projected onto the record carrier via facets of a rotating polygonal mirror. The scanning spots formed on the recording surface by the two laser beams follow parallel scanning paths. The tape is moved in the longitudinal direction so that the recording surface is scanned along parallel scanning paths which are such that the path scanned by the first scanning spot is scanned by the second scanning spot during the next scan. The recording surface is erased during scanning by the first scanning spot. Subsequently, information is recorded in this erased part of the recording surface during scanning by the second scanning spot. This results in a track pattern of parallel information tracks whose track directions extend transversely of the longitudinal direction to the tape.

During recording, the track pitch (distance between the centres of two adjacent tracks) is not controlled. As a result of inevitable variations in parameters which influence the track pitch, for example variations in tape transport speed, the track pitch of the resulting track pattern will vary. Therefore, it is desirable that during recording information about the track pitch is available for the purpose of track pitch monitoring and/or control.

SUMMARY OF THE INVENTION

It is an object of the invention to provide a device which enables track-pitch information to be derived from radiation emanating from a scanning spot. To this end, a scanning device of the type defined in the opening paragraph is characterised in that the device further comprises a unit for bringing about a movement of the second scanning spot relative to the first scanning spot in a direction transverse to the direction of the first scanning spot, the position of the second scanning spot with respect to the first scanning spot being related to the position of the first scanning spot on the first scanning path.

The device in accordance with the invention enables information to be recorded by means of the first scanning spot. During recording, the second scanning spot is moved in a direction transverse to the direction of the path of the first scanning spot, and during this movement it will pass information tracks formed during previous scans by means of the first scanning spot. Radiation emanating from the second scanning spot is modulated by the information in the tracks passed. The degree of modulation is maximal at the instant at which the centre of the scanning spot coincides with the centre of an information track. The modulation decreases as the distance between the centre of the scanning spot and the nearest information track increases. Because there is a fixed relationship between the location of the first scanning spot on the first scanning path and the position of the second scanning spot relative to the centres of the tracks already recorded, a deviation of the actual track pitch from a desired track pitch can be detected on the basis of a deviation in a relationship between the degree of modulation of the second radiation beam and the position of the first scanning spot on its scanning path.

The scanning device can be used not only for recording information, but also for reading the recorded information. In that case, a deviation in the previously-mentioned relationship indicates that the centre of the first scanning spot does not coincide with the centre of the track being scanned. In other words, a deviation in that relationship is indicative of a tracking error.

Another embodiment of the scanning device is characterised in that the unit for bringing about the above-mentioned movement comprises a deflection unit which is rotatable about an axis of rotation and has a reflecting surface, via which surface the first and the second radiation beam are directed to the record carrier. The surface is such that the central axis of the second radiation beam, at the location where this beam impinges on the reflecting surface, is not disposed in a plane perpendicular to the axis of rotation, and the central axis of the first radiation beam, at the location where this beam impinges on the reflecting surface, is not parallel to the central axis of the second radiation beam. This embodiment has the advantage that it can be realised in a simple manner.

The deflection unit can be, for example, a galvanometer mirror. However, a polygonal mirror is to be preferred.

The scanning device in accordance with the invention is particularly suitable for use in recording and/or read apparatus. An embodiment of such a recording and/or read apparatus, comprising a scanning device in accordance with the invention for reading and/or writing information from and/or in tracks of a recording surface (corresponding to the scanning surface), which tracks have directions substantially corresponding to the direction of the scanning path followed by the first scanning spot, further comprises a unit for bringing about a movement of the recording surface relative to the optical system in a given direction of movement, a detection system for converting radiation emanating from the second scanning spot into a corresponding detection signal, and a unit for deriving a position measurement signal on the basis of a deviation in a relationship between the detection signal and a reference signal which is indicative of the position of the first scanning spot on the first scanning path.

A deviation in the previously-mentioned relationship can be identified simply by a shift of the detection signal relative to the reference signal. Such a shift can be detected by detecting phase shift of the detection signal relative to the reference signal. However, it is also possible to detect a shift in time of the detection signal relative to the reference signal.

A further embodiment of the apparatus is characterised in that the apparatus includes a unit for deriving from the detection signal a speed measurement signal which is related to the period of the detection signal. The number of tracks passed by the second scanning spot per unit of time is indicative of the speed of movement of the first scanning spot in a direction transverse to the track direction. The period of the detection signal, which is related to the time between two track crossings, is, therefore, indicative of the speed of the first scanning spot in a direction transverse to the tracks.

Since during recording the second scanning spot passes recently recorded information tracks, it is possible to derive the quality of the recorded tracks from the detection signal. An embodiment by means of which this is realised is characterised in that the apparatus includes a unit for deriving from the detection signal a quality measurement signal which is indicative of a quality of the tracks traversed by the second scanning spot. The quality measurement signal can be used, for example, for adjusting recording parameters to values for which the quality of the tracks complies with a given standard.

A further embodiment of a scanning device in accordance with the invention is characterised in that the device comprises means for directing a third radiation beam to the scanning surface so as to form a third scanning spot on the scanning surface. This embodiment of the scanning device has the advantage that the desired information can be determined on the basis of two scanning spots. If the position of the second and the third scanning spot at opposite sides of the scanning path is selected to be, for example, symmetrical relative to the first scanning spot, this has the advantage that during recording the second or the third scanning spot moves in an area already provided with tracks. The last-mentioned embodiment of the scanning device having at least three scanning spots also has additional advantages when used in read apparatus. A first advantageous embodiment of a read apparatus comprising the last-mentioned embodiment of the scanning device, for reading and/or writing information from and/or in tracks of a recording surface (corresponding to the scanning surface), which tracks have directions substantially corresponding to the direction of the scanning path followed by the first scanning spot, further comprises a first detection system for converting radiation emanating from the second scanning spot into a corresponding detection signal, a second detection system for converting radiation emanating from the third scanning spot into a corresponding detection signal, and a unit for deriving a position measurement signal on the basis of a deviation of the first and/or the second detection signal. Since the second and the third scanning spot are situated symmetrically relative to the first scanning spot, a tracking error will result in opposite phase shifts in the detection signals relative to the reference signal. The phase difference between the first and the second detection signal is, therefore, indicative of the tracking signal. In this case, it is not necessary to generate a reference signal which is indicative of the position of the first scanning spot on the first scanning path.

A second advantageous embodiment of a read apparatus comprising the last-mentioned embodiment of the scanning device, for reading and/or writing information from and/or in tracks of a recording surface (corresponding to the scanning surface), which tracks have directions substantially corresponding to the direction of the scanning path followed by the first scanning spot, further comprises a first detection system for converting radiation emanating from the second scanning spot into a corresponding first detection signal, a unit for determining a first deviation in a relationship between the first detection signal and a reference signal which is indicative of the position of the first scanning spot on the first scanning path, a second detection system for converting radiation emanating from the third scanning spot into a corresponding second detection signal, a unit for determining a second deviation in a relationship between the second detection signal and the reference signal, and a unit for deriving from the first and the second detection signal an inclination measurement signal on the basis of a combination of the first and the second deviation. This embodiment makes advantageous use of the fact that if the direction of the scanning path and the direction of the tracks do not correspond, the deviations in the relationship between the detection signals and the reference signal are no longer the opposites of one another as in the case of corresponding directions of the scanning path of the first scanning spot and the tracks. The sum of the deviations in the relationships between the detection signals and the reference signal is, therefore, indicative of the angle between the direction of the tracks and the direction of the scanning path of the first scanning spot. The inclination measurement signal can be used for monitoring and/or controlling this angle.

BRIEF DESCRIPTION OF THE DRAWINGS

The invention will now be described in more detail with reference to FIGS. 1 to 9, in which.

DESCRIPTION OF THE PREFERRED EMBODIMENTS

Figure 1:
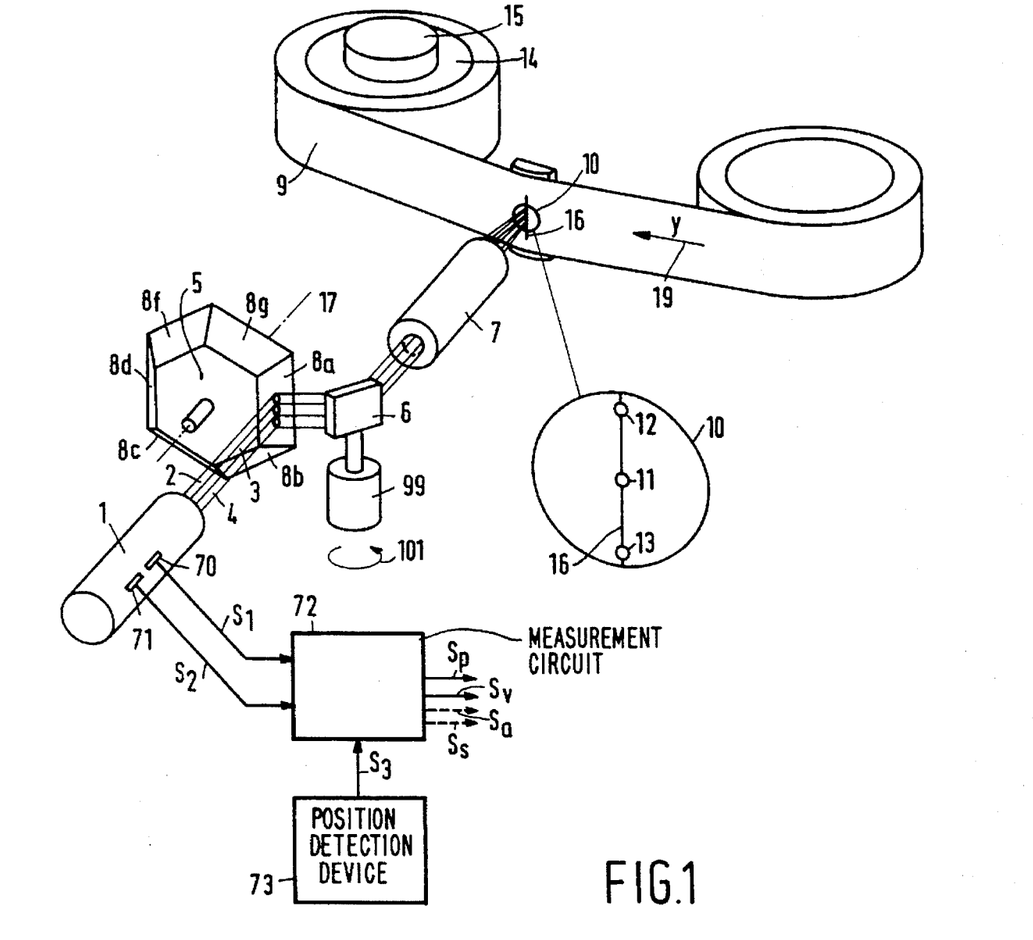
FIG. 1 shows an embodiment of an optical recording and/or read apparatus in accordance with the invention comprising a scanning device in accordance with the invention.

FIG. 1 shows an optical recording and/or read apparatus comprising a first embodiment of a scanning device in accordance with the invention. The scanning device shown comprises an optical scanning system formed by a light path 1, a rotatable polygonal mirror 5, a deflection mirror 6 and a focusing objective 7. The light path 1 may be of a type customary in optical or magneto-optical recording and/or read equipment. Such a light path comprises a beam generating unit for generating three radiation beams 2, 3 and 4, whose directions differ slightly from one another and of which two beams (2 and 4) are situated symmetrically relative to a central scanning beam (3).

The radiation beams 2, 3 and 4 are directed to a scanning surface via the polygonal mirror 5, the deflection mirror 6 and the focusing objective 7, which scanning surface is formed by the surface of a record carrier 9 in the form of a tape of a magneto-optical or optical type. (Hereinafter this surface will also be referred to as a "recording surface"). The radiation beams 2, 3 and 4 are focused by the focusing objective 7 to form tiny scanning spots on the recording surface of the record carrier 9. Since the directions of the three radiation beams differ, the positions of the scanning spots will also be different. A part 10 of the recording surface where the radiation beams are incident on the recording surface is shown to an enlarged scale. In the part 10, a first scanning spot formed by the radiation beam 3 bears the reference numeral 11. A second and a third scanning spot produced by the radiation beams 2 and 4, respectively, are referenced 12 and 13, respectively.

The polygonal mirror 5 has reflecting facets 8a, ..., 8g and is rotated about an axis 17 by drive means, not shown, which are described in detail in, for example, U.S. Pat. No. 5,171,984 and EP-A-0,459,586, to which U.S. Pat. No. 5,191,221 corresponds, herewith incorporated by reference. The polygonal mirror 5 is positioned in such a manner relative to the light path 1 that as the polygonal mirror 5 rotates about the axis of rotation 17 the radiation beams 2, 3 and 4 successively impinge on one of the facets 8a, ..., 8g, as a result of which the recording surface is scanned repeatedly by the scanning spots 11, 12 and 13, the scanning spots 11, 12 and 13 being moved synchronously over the recording surface along scanning paths 16, 18 and 19, respectively (see FIG. 2). Since the radiation beams 2 and 4 are in a symmetrical position relative to the beam 3, the scanning spots 12 and 13 produced by the radiation beams 2 and 4 are situated symmetrically relative to the scanning spot 11 produced by the radiation beam 3.

Figure 2:
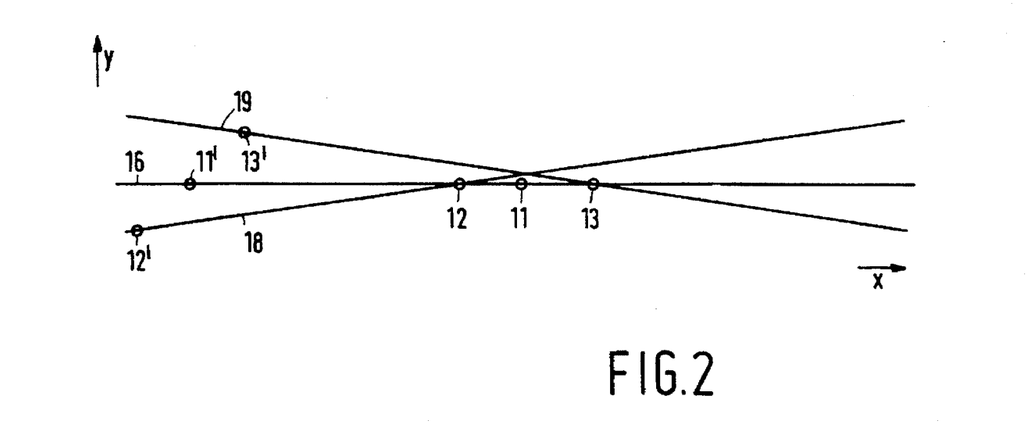
FIG. 2 shows scanning paths followed by scanning spots during scanning of a recording surface.

The polygonal mirror 5 has the shape of a truncated pyramid whose inclined faces form the facets 8a, ..., 8g and whose axis of rotation 17 intersects the base in its centre of gravity and extends perpendicularly to this base. This means that the facets 8a, ..., 8g are inclined relative to the axis of rotation 17 of the polygonal mirror 5. As a result of this inclination, the scanning paths followed by the scanning spots 11, 12 and 13 are not parallel but intersect one another, as is shown in FIG. 2. The reason for this will be explained with reference to FIGS. 3 and 4.

Figures 3, 4:
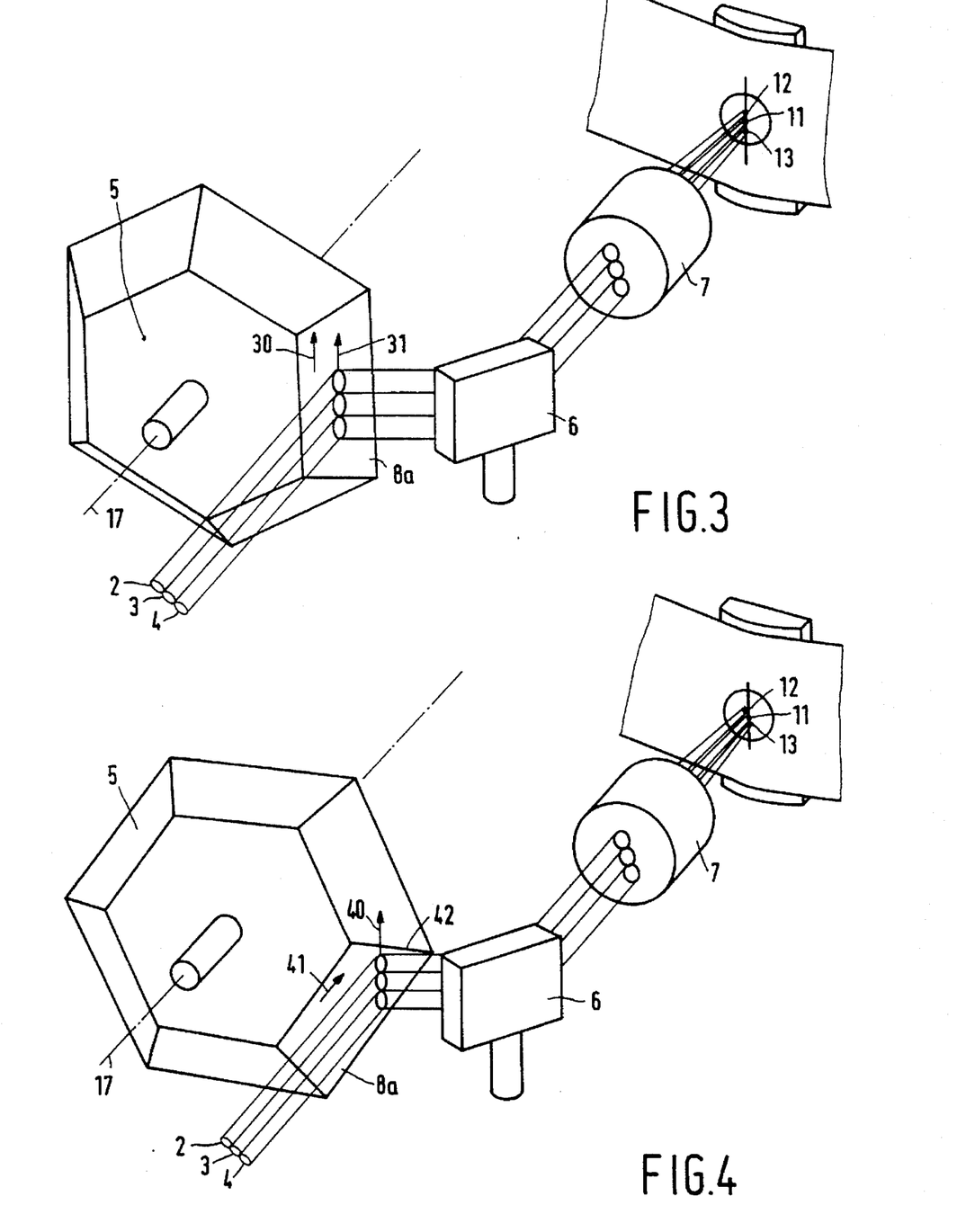
FIGS. 3 and 4 show deflection means in different positions.

FIG. 3 shows the polygonal mirror 5 in a position in which the radiation beams 2, 3 and 4 impinge on the facet 8a substantially in its centre. The positions of incidence of the beams 2, 3 and 4 define a direction indicated by an arrow 31. An arrow 30 indicates a direction of a line intersecting a plane perpendicular to the axis of rotation 17 and the surface of the facet 8a.

FIG. 4 shows the polygonal mirror 5 in a position in which the radiation beams 2, 3 and 4 impinge on the facet 8a in the proximity of an edge 42. The positions of incidence of the beams 2, 3 and 4 define a direction indicated by an arrow 40, which deviates from the direction of an arrow 41 indicating the direction of a line intersecting a plane perpendicular to the axis of rotation 17 and the surface of the facet 8a.

The positions relative to one another for the position of the polygonal mirror 5 shown in FIG. 3 correspond to the positions of the scanning spots 11, 12 and 13 shown in FIG. 2. The positions of the scanning spots 11', 12' and 13' shown in FIG. 2 correspond to the position of the polygonal mirror shown in FIG. 4.

The variation of the positions of the scanning spots relative to one another results in displacements of the scanning spots 12 and 13 relative to the scanning spot 11 in a direction y transverse to the scanning path 16. The positions of the scanning spots 12 and 13 with respect to the first scanning spot 11 are related to the position of the polygonal mirror 5, and hence, to the position x of the first scanning spot 11 on the first scanning path 16.

The embodiment described above employs a deflection means which is rotatable about an axis of rotation and which is formed by the polygonal mirror 5 having facets 8 which are inclined relative to the axis of rotation 17 in order to obtain synchronous movements of the scanning spots 11, 12 and 13 in such a manner that the scanning spots 11, 12 and 13 are moved relative to one another in the y direction transverse to the scanning directions, and the position of the scanning spot 12 and the scanning spot 13 with respect to the scanning spot 11 is related to the position x of the scanning spot 11 on the first scanning path 16.

However, such movements of the scanning spots can also be obtained by other deflection means rather than a polygonal mirror having facets which are inclined relative to the axis of rotation. It will be obvious to those skilled in the art that instead of the polygonal mirror 5 other rotatable deflection means comprising a reflecting surface reciprocated about a centre position, such as for example a galvanometer mirror, can be used for generating such synchronous scanning movements.

In addition, it is not necessary for the reflecting surface of the deflection means to be inclined relative to the axis of rotation. When a rotatable deflection means is used, it is important only that, firstly, the central axis of the second radiation beam, at the location where it impinges on the reflecting surface of the deflection means, is not situated in a plane perpendicular to the axis of rotation of the deflection means, and, secondly, the central axes of the first and the second radiation beam are not parallel.

Synchronous movements of the scanning spots can also be obtained by other means. For example, it is possible to use a separate deflection means for each beam, which means perform. mutually synchronised movements, with the corresponding scanning paths on the scanning surface scanned by the synchronous movements of the deflection means intersecting one another.

In addition, it is to be noted that the deflection means themselves need not be movable. Deflections of radiation beams with a varying angle can also be obtained with stationary deflection means, such as for example acousto-optical deflection means.

Finally, it is to be noted that the radiations beams can also be generated by means of a so-called laser array. Such an array mat comprises a plurality of different laser rows. The lasers of each row are oriented in another direction. By each time activating a following laser in a row, the beam-generating source is moved, which results in a movement of the scanning spot produced by the corresponding radiation beam. By synchronising the activation of the lasers in the various rows, a synchronous movement of the scanning spots corresponding to the radiation beams generated by means of the laser rows is obtained along different paths.

The embodiments of the scanning device described above are particularly suitable for use in a recording apparatus which by means of the radiation beam 3 records effects which are readable by means of a read radiation beam. Such an effect may cause, for example, a variation of the intensity of reflected radiation of the read beam, such as for example a recess or pit producing destructive interference in the radiation. Such an effect may for example alternatively comprise a magnetic domain having a given direction of magnetisation, causing a change of the polarisation of the radiation.

To record effects, the intensity of the radiation beam 3 (of FIG. 1) during scanning is usually switched between a write level which is high enough to produce an effect. and a read level which is not high enough to produce an effect. It is to be noted that in the case of magneto-optical recording, the effects can also be obtained by means of a magnetic field of varying strength, which is applied at the location of the recording surface part scanned by a write beam. The intensity levels of the radiation beams 2 and 4 are inadequate to produce optically detectable effects in the recording surface in order to preclude the undesired formation of effects.

In addition to the scanning means, the embodiment of a recording and read apparatus in accordance with the invention shown in FIG. 1 comprises transport means for realising a movement of the record carrier 9 relative to the optical system in the direction y transverse to the direction of the scanning path 16. These transport means may be of a customary type shown diagrammatically in FIG. 1 and comprising a reel 14 driven by a motor 15 for taking up the record carrier tape 9, which is thus moved in the direction y (which corresponds to a longitudinal direction of the record carrier tape 9). The direction y is indicated by an arrow 19 in FIG. 1.

The recording apparatus described above records successive tracks of effects on the record carrier 9 at the location of the scanning path 16 scanned by the scanning spot 11. Thus, a pattern of parallel tracks is recorded, a following track being written each time that the scanning spot 11 scans the recording surface.

Figure 5A:
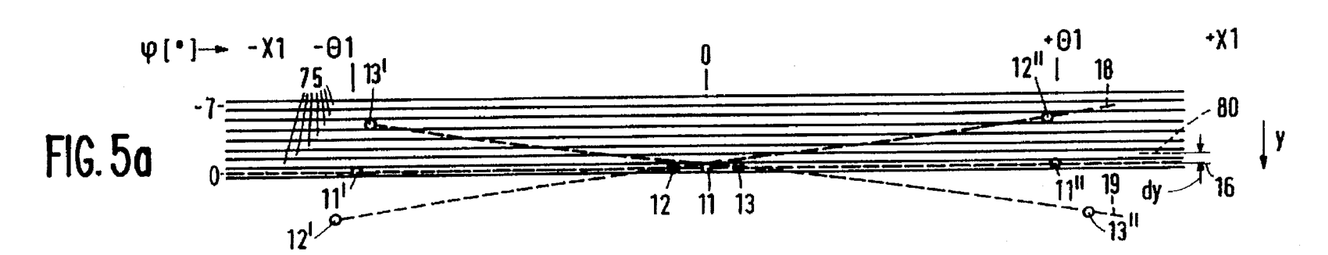
FIGS. 5a–5h show scanning paths of scanning spots during recording of a track pattern and corresponding signals.

By way of illustration, FIG. 5a shows tracks 75 obtained in this manner. The tracks 75 have further been numbered as tracks $-7, \ldots, -1, 0$. The position along the scanning path 16 is indicated by the quantity x and the corresponding position of the polygonal mirror 5 by the quantity phi, which represents the position of the facet used for scanning relative to its centre position in degrees. There is an unambiguous relationship between the position of the polygonal mirror 5 and the position x of the scanning spot 11 on the scanning path 16. The positions of the scanning spot produced by the radiation beam 3 for three different values of phi (phi=-22, phi=0 and phi=22) are referenced 11', 11 and 11". The positions of the scanning spots formed by the radiation beams 2 and 4 for the three above-mentioned values of phi are referenced 12' and 13', 12 and 13, and 12" and 13". The scanning spot 11 moves along the path 16, and the scanning spots 12 and 13 move along the paths 18 and 19, which cross the path 16.

When the scanning spot 11 travels from position $x=-x_1$ mm to $x=0$ mm, the scanning spot 13 moves past a number of tracks, and the scanning spot 12 moves over a part of the recording surface where no tracks 75 have been recorded yet. When the scanning spot 11 moves from position $x=0$ mm to $x=+x_1$ mm, the scanning spot 13 moves past a number of tracks 75, and the scanning spot 13 moves over a part of the recording surface without any tracks 75. At the locations where the scanning spots 12 and 13 wholly or partly coincide with one of the tracks 75 the radiation reflected from the record carrier 9 will be modulated in accordance with the pattern of effects or information pattern in the track 75. The degree of modulation corresponds to the degree in which the scanning spot coincides with the track 75.

The recording apparatus, in accordance with the invention, shown in FIG. 1 further comprises detection systems of a type known per se for converting the radiation emanating from the scanning spots 12 and 13 into detection signals S1 and S2 which correspond to the modulation produced in the reflected radiation by the information pattern. In the embodiment shown in FIG. 1, the reference numerals 70 and 71 denote detection systems for converting the radiation which returns from the scanning spots 12 and 13 into the light path 1 via the focusing objective 7, the deflection mirror 6 and the polygonal mirror 5. The detection systems 70 and 71 may be of a generally known type and fall beyond the scope of the invention, for which reason they are shown only diagrammatically.

The recording apparatus shown in FIG. 1 further comprises means for generating a reference signal S3 indicative of the position of the scanning spot 11 on the scanning path 16, and a measurement circuit 72 for deriving from the detection signals S1 and S2 and the reference signal S3 one or more measurement signals Sp, Sv and/or Sa for monitoring and/or controlling the recording process. How the measurement signals Sp, Sv, and Sa are derived will be explained hereinafter.

As already stated, the scanning spots 11, 12 and 13 perform synchronous movements. Variations in the distances between the scanning spots viewed in the direction y transverse to the scanning directions are related to the position of the polygonal mirror 5 and, consequently, to the position of the scanning spot 11 on the first scanning path 16. For a given value of phi the centres of the scanning spots 12 and 13 coincide with the centres of the previously written tracks 75. The given values of phi for which this is the case depend on the distance of the scanning path 16 from the track 75 passed by the scanning spot 12 or 13. Since the distances between the tracks 75 already formed have a constant value equal to the track pitch, the values of phi for which the centres of the scanning spots pass the centres of the tracks 75 depend on a distance dy between the scanning path 16 and the centre of the last recorded track 75 (the track having the track number $-1$ in FIG. 5a). This means that the maximum and minimum modulations of the detection signals occur at predetermined positions of the polygonal mirror 5.

Figure 5B:
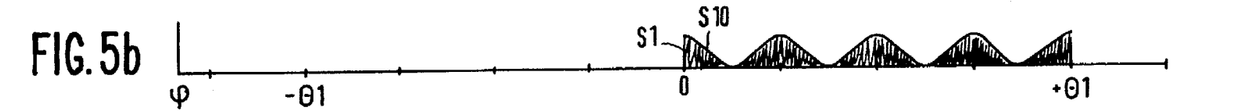
Figure 5C:
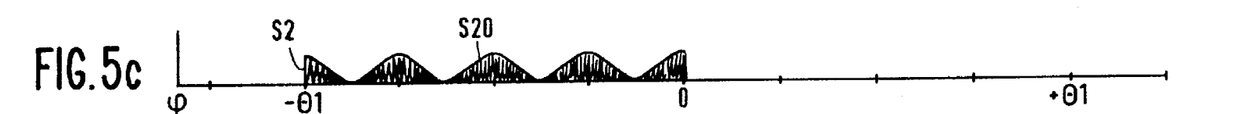

By way of illustration, FIG. 5b shows the detection signal S1 as function of phi and as a function of the position x in the case that the distance dy from the scanning path 16 to the centre of the adjacent track, represented as a line 80, corresponds to a desired track pitch. FIG. 5c shows the detection signal S2 as a function of phi for a part of the scanning path 16 in the case that the distance dy corresponds to the desired track pitch. FIGS. 5b and 5c further show the signal envelopes S10 and S20 of the detection signals S1 and S2. These signal envelopes S10 and S20 have substantially sinusoidal shapes representing the degrees of modulation of the corresponding detection signals S1 and S2. The maxima of each of the signal envelopes S10 and S20 represent the positions for which the modulation of the detection signal is maximal. These are the positions for which the centre of the corresponding scanning spot 12 and 13 coincides with the centre of one of the tracks.

As is shown in FIGS. 5b and 5c, there is a relationship between the detection signals S1 and S2 and phi (and, as a consequence, the position x). This relationship depends on the distance dy. If this distance varies, the positions where the maxima and minima of the signal envelopes S10 and S20 occur will change. This is because the centres of the scanning spots 12 and 13 then coincide with the centres of the tracks 75 at other positions x of the scanning spot 11. For example, when the distance dy decreases the position values for which the maxima and minima of the signal envelope S10 occur will change in a positive direction (hereinafter also referred to as "lag") and the position values for which the maxima and minima in the signal envelope S20 occur will change in a negative direction (hereinafter also referred to as "lead"). Conversely, when the distance dy increases the position values for which the maxima and minima of the signal envelope S10 occur will change in a negative direction (lead) and the position values for which the maxima and minima in the signal envelope S20 occur will change in a positive direction (lag). Accordingly, a deviation in the relationship between the detection signals S1 and S2 from the relationship corresponding to a value of the distance equal to the desired track pitch is indicative of a difference between the distance dy and the desired track pitch. In this respect, it is to be noted that because of the symmetrical position of the scanning spots 12 and 13 relative to the scanning spot 11 the influence of a variation of dy on the relationship between the detection signal S1 and the position x is opposite of the influence on the relationship between the detection signal S2 and the position x.

The deviation in the relationship between the detection signals S1 and S2 and the reference signal S3 is determined by means of the measurement circuit 72.

The reference signal S3 may comprise, for example, a position signal whose signal value corresponds to the position of the deflection means (polygonal mirror 5 in the present embodiment), and hence, to the position x of the scanning spot 11. Alternatively, the reference signal S3 may comprise a pulse-shaped signal whose edges correspond to given positions of the deflection means, for example those positions for which the detection signal S1 or the detection signal S2 has its maxima or minima at a desired value of dy.

The reference signal S3 is obtained from a position detection device 73. The position detection device may form part of a control system for controlling the speed and/or position of the polygonal mirror 5. Drive circuits in which information signals are available to indicate the position of a driven object are generally known and are, therefore, not described in detail.

The measurement circuit 72 may comprise a circuit which detects a (phase or time) shift of the detection signals S1 and S2 relative to the reference signal. The measurement circuit 72 may, for example, be of a type which determines for which values of x the maxima and minima of the detection signals occur, on the basis of the detection signals S1 and S2, and a reference signal S3 representing the position of the polygonal mirror 5, and subsequently compares the values determined with positions laid down for a relationship belonging to the desired value of the distance dy. Such a circuit can be realised, for example, by means of a program-controlled circuit loaded with a suitable program for carrying out the above operations.

Alternatively, the measurement circuit 72 may comprise a circuit which determines whether there is a phase difference between the detection signals and a pulse-shaped signal whose edges indicate the positions at which maxima and the minima in the detection signals should occur. For this purpose various kinds of phase comparison circuits can be used.

Figure 6:
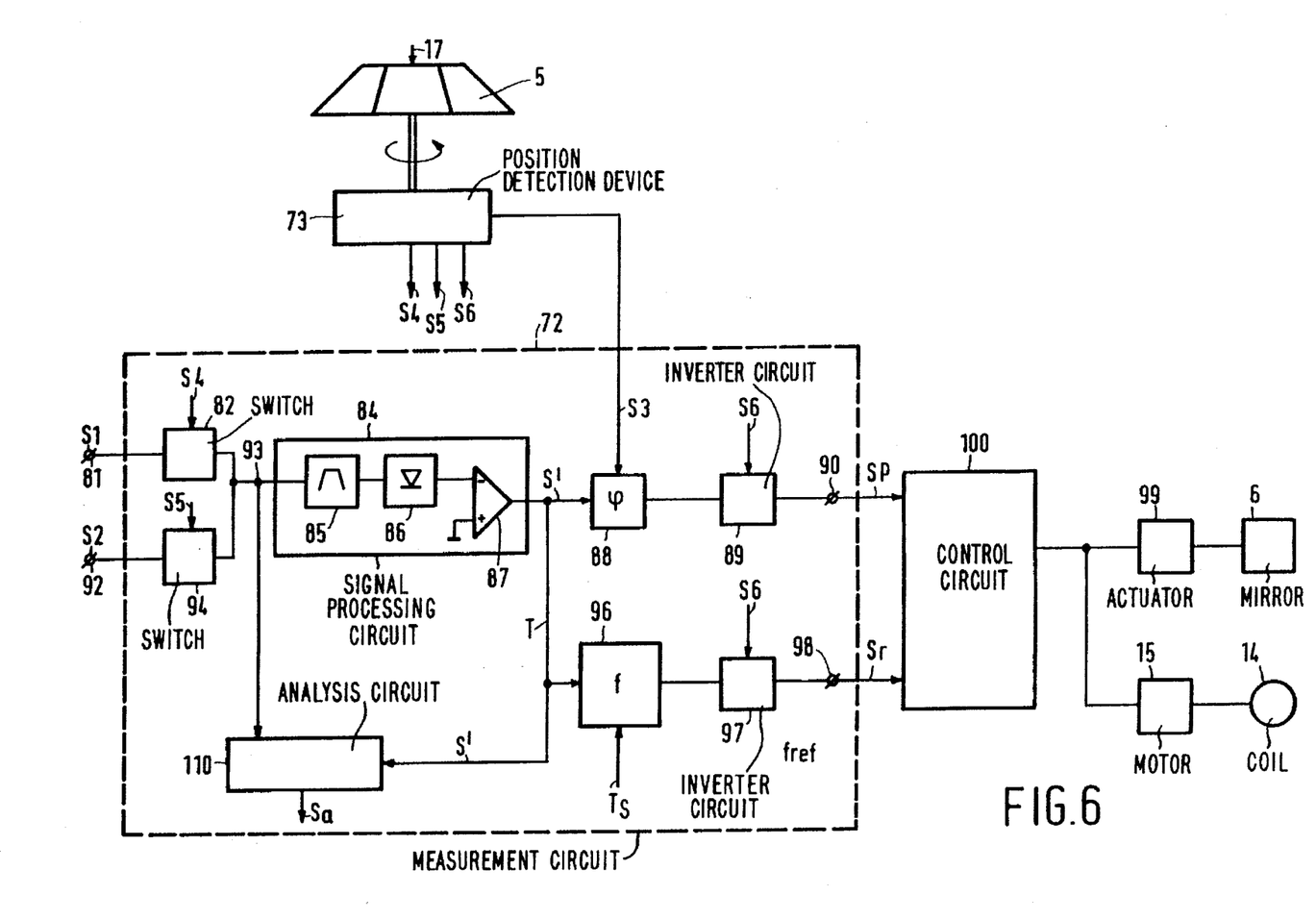
FIG. 6 shows an example of a measurement circuit for use in an optical recording and/or read apparatus in accordance with the invention.

FIG. 6 shows an example of the measurement circuit 72 in greater detail. The measurement circuit 72 has an input 81 for receiving the detection signal S1. A switch 82 controlled by a signal S4 connects the input 81 to an input 93 of a signal processing circuit 84. The processing circuit 84, converts the detection signal received at its input into a binary signal S', which can assume a first logic value to indicate that the scanning spot corresponding to that detection signal is situated substantially on one of the tracks 75, and which can assume a second logic value to indicate that the corresponding scanning spot is situated substantially between two tracks 75. The signal processing circuit 84 may be of a conventional type, which is also referred to as an off-track detector. Such an off-track detector may comprise, for example, a series arrangement of a band-pass filter 85, an envelope detector 86 and a comparator 87.

The signal S' is available at an output of the circuit 84 and is applied to a phase detector 88. By way of illustration, the signal S' is shown as function of phi in FIG. 5d. An output of the phase detector 88 is applied to an output 90 of the measurement circuit 72 via an inverter circuit 89 controlled by a signal S6.

The measurement circuit 72 further has an input 92 for receiving the detection signal S2. The input 92 is connected to the input 93 of the circuit 84 by a switch 94 controlled by a signal S5.

Figures 5D, 5E:
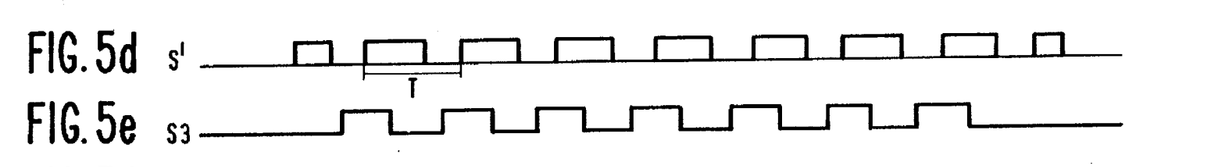

The phase detector 88 further receives the signal S3, which is pulse-shaped in the present case and whose edges indicate the positions at which the maxima and minima in the detection signals should occur. By way of illustration, FIG. 5e shows the reference signal S3 as a function of the position phi.

Figure 5F:
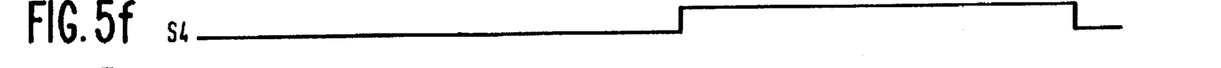
Figure 5G:
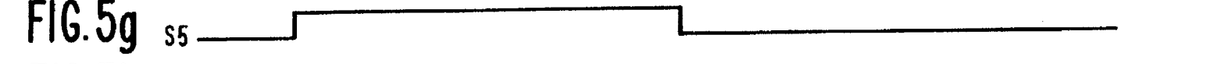
Figure 5H:
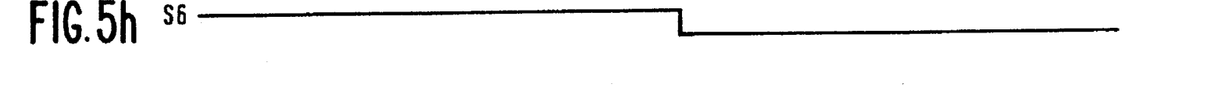

FIGS. 5f, 5g and 5h further show the signals S4, S5 and S6, respectively.

The signal S4 has a logic value "1" for 0<phi<$\Theta_1$. For these values of phi, the scanning spot 12 is situated on a part of the recording surface already provided with tracks 75, and the detection signal S1 exhibits a modulation caused by these tracks 75.

The signal S5 has a logic value "1" for $-\Theta_1$<phi<0. For these values of phi, the scanning spot 13 is situated on a part of the recording surface already provided with tracks 75, and the detection signal S2 exhibits a modulation caused by these tracks 75.

The signal S6 has a logic value "1" for -30<phi<0. The edge (signal-level transition) at the value phi=0 indicates the boundary between the range in which the scanning spot 12 is situated in the area with tracks 75 and the range in which the scanning spot 13 is situated in the area with tracks 75.

The signals S3, S4, S5 and S6 can be generated in a customary manner by means of the position detection device 73. For this purpose such a position detection device 73 may be coupled to a shaft of the polygonal mirror 5. Such a position detection device 73 coupled to the shaft of the polygonal mirror 5 may carry a so-called shaft-position encoder, if required in combination with counting circuits. Such position detection devices are known per se and are not described in detail because they fall beyond the scope of the invention.

The operation of the measurement circuit 72 will be described in detail hereinafter. The polygonal mirror 5 is driven with a constant angular velocity so that the value of phi (indicating the position of the facet used for deflection) each time covers the range from -30 to 30 degrees. In the part $-\Theta_1$<phi<0 of the range, the detection signal S2 will be transferred to the circuit 84 via the switch 94, which is controlled by the signal S5. The phase detector 88 determines the phase difference between the reference signal S3 and the signal S' derived on the basis of the detection signal S2. This phase difference is 90 degrees for the desired value of dy (see also FIG. 5). The phase detector 88 is of a type which supplies a phase-difference signal whose (average)

signal strength is proportional to the phase difference between the signal S' and S3 minus 90 degrees. Hence, the sign of the (average) signal strength represents the direction of the deviation of dy relative to the desired track pitch.

In a simple form, such a phase detector may comprise a so-called EXCLUSIVE-OR circuit. However, numerous other types of phase detectors may be used. The phase-difference signal obtained, which is a measure of the deviation of dy, is transferred without any change to the output 90 of the measurement circuit 72 via the controllable inverter circuit 89.

At the instant at which the polygonal mirror passes through the position phi=0 the detection signal S2 is blocked by the switch 94 and the detection signal S1 is transferred to the input 93 of the circuit 84 via the switch S4 controlled by the signal 82. The phase detector 88 now determines the phase difference between the reference signal S3 and the signal S' derived on the bases of the detection signal S1. As already stated, the influence of dy on the detection signal S1 is opposite to the influence of dy on the detection signal S2. The inverter circuit 89 controlled by the signal S6 provides a correction for this. Indeed, at the instant (phi=0) at which the detection signal S2 at the input 93 is replaced by the detection signal S1 the inverter circuit 89 is activated, as a result of which the phase-difference signal applied to the input 90 is inverted.

The period T of the signal S' represents the time interval between two successive track crossings by one of the scanning spots 12 or 13. If the scanning spot 11 used for recording has a motion component in the direction y transverse to the tracks 75, this will result in a change of the value of T relative to a value Ts, which corresponds to a situation in which the position of the scanning spot in a direction transverse to the tracks 75 does not change (value of dy remains constant). The difference between the actual value of T and Ts consequently represents the speed of the scanning spot 11 in the direction y transverse to the tracks 75. Here, it is to be noted again that the influence of the speed on the period of the detection signal S1 is opposite to the influence of the speed on the period of the detection signal S2.

In order to determine the period T of the signal S' the measurement circuit 72 may be provided with a circuit 96 of a type known per se. The circuit 96 may comprise, for example, a time measurement circuit for determining the length of the period T and a subtracter circuit for determining the difference between the measured value of T and Ts. The circuit 96 supplies a difference signal whose sign corresponds to the sign of the detected difference to an output 98 via an inverter circuit 97 controlled by the signal S6. The inverter circuit 97 controlled by the signal S6 serves to correct the difference in influence of the speed of the scanning spot 11 on the signals S1 and S2. In the foregoing the period of the detection signals is determined in order to determine a measure of the speed of the scanning spot 11. It will be obvious to those skilled in the art that for determining a measure of the speed of the scanning spot 11 another signal may be derived which is related to the period of the signal S', for example a signal which is indicative of the frequency of the signal S'.

The signal on the output 90, hereinafter referred to as the position measurement signal Sp, is indicative of the deviation of dy relative to a desired track pitch. The signal at the output 98, hereinafter referred to as the speed measurement signal Sv, is indicative of the speed of the scanning spot 11 in the direction y transverse to the tracks 75. The position measurement signal Sp and the speed measurement signal Sv can be used to monitor whether the position and speed of the scanning spot 11 in the y direction remain within specific standards during recording.

However, it is preferred to use the position measurement signal Sp and the speed measurement signal Sv for controlling the y position of the scanning spot 11. This can be effected, for example, by adapting the speed of the drive means (coil 14 and motor 15 in FIG. 1) in dependence upon a control signal derived from the position measurement signal Sp and the speed measurement signal Sv by a control circuit 100.

Generally, such a control circuit will have a limited bandwidth owing to the inertia of the drive means (coil 14 and motor 15), so that such a control circuit can only compensate for low-frequency deviations of dy. If high-frequency variations should also be compensated for, a fast actuator can be used, which for example acts upon the optical path of the radiation beam and which is also controlled by means of the control circuit 100. One possibility is to make the deflection mirror 6 rotatable about an axis 101 and to drive it with a fast actuator 99.

Although it is advantageous to control the position of the scanning spot 11 on the basis of both the position measurement signal Sp and the speed measurement signal Sv this is not necessary. For example, it is also possible to control this position only in dependence upon the position measurement signal Sp.

In the embodiment described above, the detection signals S1 and S2 are used for deriving the position measurement signal Sp and the speed measurement signal Sv. However, this is not necessary. The position measurement signal Sp and the speed measurement signal Sv can also be derived from only one of the two detection signals S1 and S2. It will also be evident that the generation of one of the radiation beams 2 and 4 may then be dispensed with.

The detection signals S1 and S2 obtained during recording can also be used for determining the quality of the information patterns in recently recorded tracks 75 traversed by the scanning spot 12 and/or 13. In order to derive a quality measurement signal Sa, the measurement circuit 72 may be provided with an analysis circuit 110 having an input connected to the input 93 for receiving the detection signal S1 or S2 depending on the control signals S4 and S5. In addition, the signal S', which indicates whether the scanning spot 12 or 13 is situated substantially on one of the tracks 75, is applied to the analysis circuit 110. The analysis circuit 110 is of a type which performs a quality analysis of a customary type during the time that S' indicates that one of the spots is situated substantially on one of the tracks 75. For so-called d.c. free signals, such a quality analysis may be effected by determining the so-called "duty cycle". However, other known quality-analysis methods (such as amplitude detection) are also possible. The analysis circuit 110 supplies a quality measurement signal Sa which is indicative of the measured quality. The quality measurement signal Sa can be used for monitoring the recording process. However, it can also be used to adjust recording which influence the quality of the information patterns.

In the foregoing, it has been described how the detection signals S1 and/or S2 can be used advantageously during the recording of information tracks. However, it is also advantageous to use these signals during the read-out of an information pattern obtained by means of the apparatus described above. The pattern of tracks can be read by scanning successive tracks with a radiation beam 3 whose intensity has been set to a read level which is inadequate to form effects in the recording surface. The presence of the effects can be detected on the basis of the radiation beam 3 reflected from the recording surface by means of a detection system known per se.

Figure 7A:
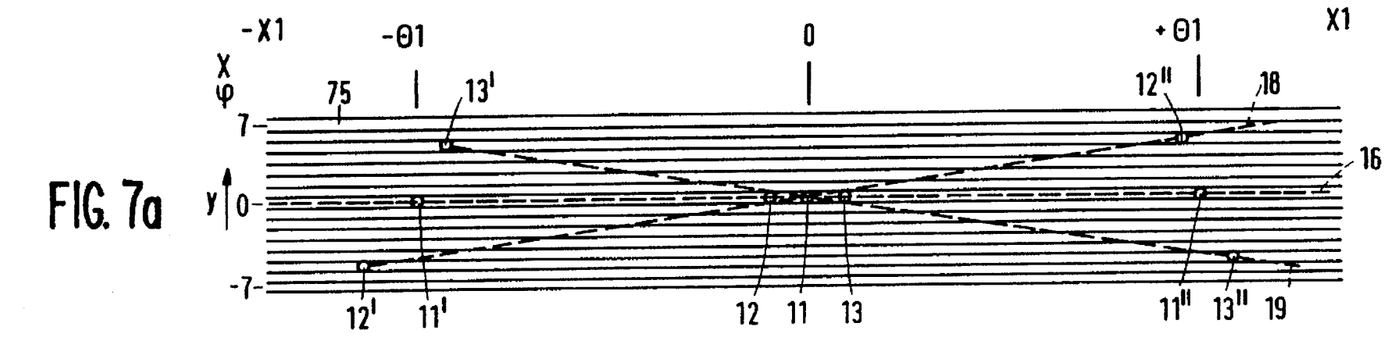
FIGS. 7a–7c show scanning paths of scanning spots during reading of a track pattern and the corresponding signals.

An embodiment of the recording and read apparatus shown in FIG. 1 which employs the detection signals S1 and S2 during reading will be described with reference to FIGS. 7a–c, 8 and 9. FIG. 7a shows a track pattern comprising tracks 75 obtained by means of the recording and read apparatus shown in FIG. 1. The tracks 75 bear the numbers −7, ..., −1, 0, ..., 7. The position along the scanning path 16 is again indicated by the quantity x and the corresponding position of the scanning facet of the polygonal mirror 5 is again indicated by the quantity phi. FIG. 7a also shows the scanning paths 16, 18 and 19 tracked by the scanning spots 11, 12 and 13, respectively.

The positions of the scanning spot formed by the radiation beam 3 for three different values of phi, i.e., phi=$-\Theta_1$, phi=0 and phi=$+\Theta_1$, are again referenced 11', 11 and 11". The corresponding scanning spots produced by the radiation beams 2 and 4 are referenced 12', 12 and 12" and 13', 13 and 13".

Figure 7B:
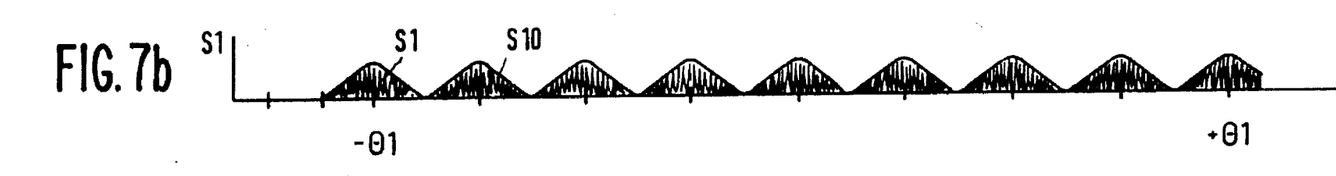
Figure 7C:
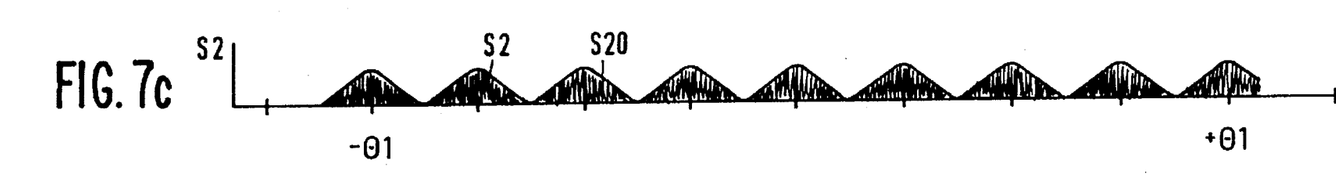

The detection signals S1 and S2 corresponding to the scanning spots 12 and 13 are shown in FIGS. 7b and 7c, respectively.

The pattern of scanning spots 12 and 13 shown in FIG. 7a is scanned in a manner similar to the pattern shown in FIG. 5a, except that in scanning the pattern shown in FIG. 7a the scanning spots are situated in that part of the recording surface in which tracks 75 are situated throughout the scanning path. This means that the two detection signals S1 and S2 are always available simultaneously during scanning of one of the tracks 75 by the scanning spot 11.

Figure 8:
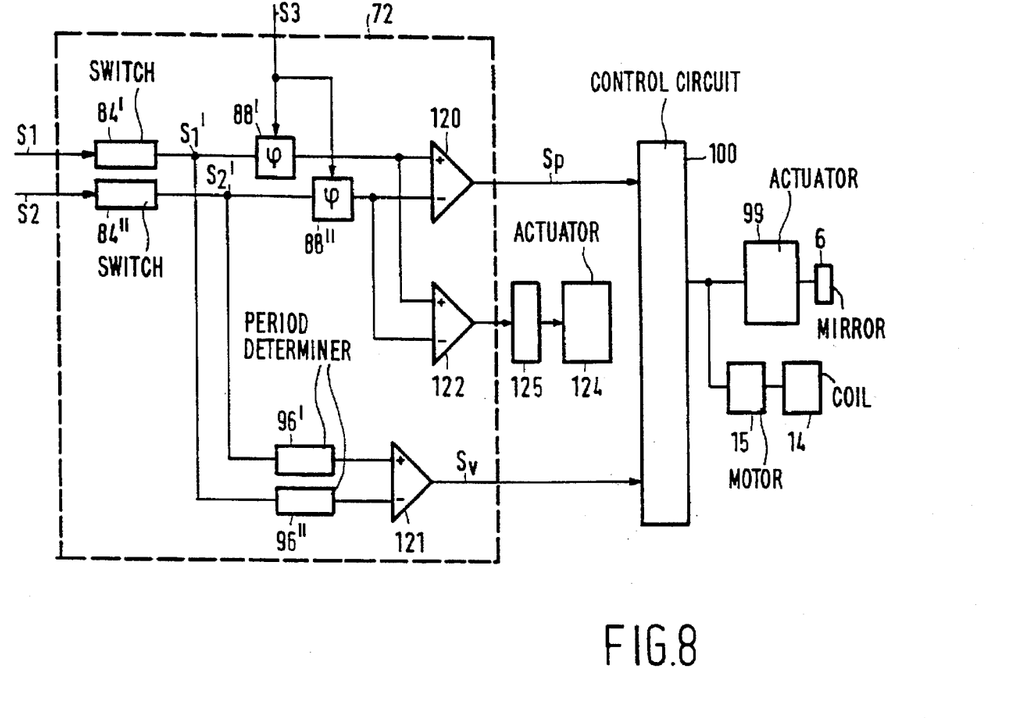
FIG. 8 shows an example of a measurement circuit for use in an optical read apparatus in accordance with the invention.

Although in principle the measurement circuit 72 shown in FIG. 6 can be used for deriving the position measurement signal Sp and the speed measurement signal Sv during scanning of the pattern shown in FIG. 7a, it is more advantageous to adapt the measurement circuit 72 in such a manner that both detection signals S1 and S2 are always used for deriving the position measurement signal Sp and the speed measurement signal Sv instead of only one of the two as in the measurement circuit 72 shown in FIG. 6. FIG. 8 shows an example of such an adapted measurement circuit 72. In this Figure, those parts which are identical to parts of the circuit shown in FIG. 6 bear the same reference numerals.

A circuit 84', which is identical to the circuit 84, converts the detection signal S1 into a binary signal S1'. A phase detector 88', which is identical to the phase detector 88, compares the phase of the signal S1' with the phase of the reference signal S3. The phase difference detected by means of the phase detector 88" is again indicative of the distance of the scanning spot 11 relative to the nearest centre of one of the tracks 75, in the present case the track having the track number 0. Hereinafter, the distance between the centre of the scanning spot 11 and the nearest centre of one of the tracks 75 will also be referred to as the tracking error. Circuits 84" and 88" derive a signal which is indicative of the tracking error from the detection signal S2 and the reference signal S3 in a similar manner to the circuits 84' and 88". The output signals of the circuits 88' and 88" are subtracted from one another by a subtracter circuit 120. The influence of a tracking error on the detection signal S1 is opposite to the influence of the tracking error on the detection signal S2, yielding the position measurement signal Sp on the output of the subtracter circuit 120. It is to be noted that the reference signal S3 is not necessary for deriving the position measurement signal Sp. Since the phase shift of the signal envelope S10 caused the tracking error is opposite to the phase shift of the signal envelope S20 caused by this tracking error, the phase difference between the detection signals S1 and S2 will be indicative of the tracking error. Therefore, it is adequate to determine the phase difference between the signal envelope S10 and the signal envelope S20.

The speed with which the scanning spot moves in the y-direction can be derived by determining the difference between the period of the signal envelope S10 and the signal envelope S20. For this purpose the circuit shown in FIG. 8 includes a circuit 96' for determining the period of the signal S1', a circuit 96" for determining the period of the signal S2', and a subtracter circuit 121 for determining the difference between the periods determined by the circuits 96' and 96". The speed measurement signal Sv, which is indicative of the speed of the scanning spot in the y direction, is available on an output of the subtracter circuit.

Figures 9A, 9B:
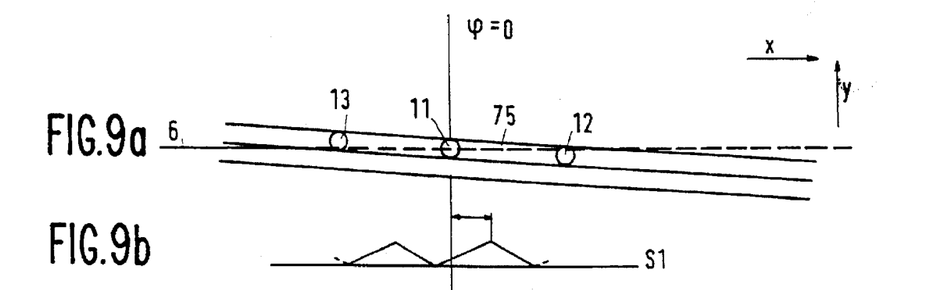
FIGS. 9a–9d show scanning paths of scanning spots and the corresponding signals in the case that the direction of the tracks does not correspond to a scanning path followed by a scanning spot during reading.

If the track pattern is read with a different scanning device than that with which it has been recorded, the direction of the scanning path 16 may not fully correspond to directions of the tracks 75, as is shown in FIG. 9. Hereinafter such a situation will be referred to as an inclination of the scanning device. Such an inclination may also occur when the speed of movement of the recording surface is increased.

Within a range corresponding to one track pitch, such an inclination can be detected on the basis of the sum of the phase difference between the signal envelope S10 and the reference signal S3, and the phase difference between the signal envelope S20 and the reference signal S3. Outside this range, the inclination can be determined on the basis of the number of tracks passed per scan and the sum. The number of tracks passed per scan provides a coarse indication of the inclination and the sum provides a more accurate indication of the inclination than the coarse indication.

In cases in which the scanning path 16 of the scanning spot 11 is parallel to the track directions, the phase difference between the signal envelope S10 and the reference signal S3 will have a value which is exactly the opposite of the phase difference between the signal envelope S20 and the reference signal S3. This opposite relationship will no longer be met if the direction of the tracks 75 no longer corresponds to the direction of the scanning path 16.

Figure 9C:
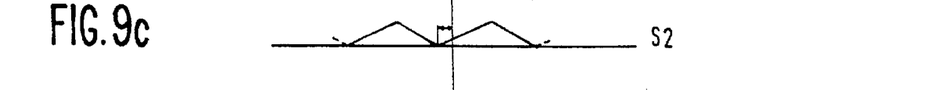
Figure 9D:
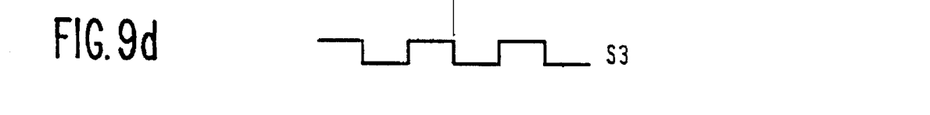

FIGS. 9b, 9c and 9d by way of illustration show the signals S1, S2 and S3 in the case that the centre of the scanning spot 11 coincides with the centre of one of the tracks 75 but the direction of the scanning path 16 and the direction of the tracks 75 do not correspond to one another. In this case, the signal envelopes S10 and S20 are in phase, which indicates that the scanning spot 11 is situated on the centre of one of the tracks 75. However, the minima and the maxima of the signal envelopes S10 and S20 no longer coincide with the edges of the reference signal S3. A measure of the inclination can therefore be obtained by summation of the phase difference between the signal envelope S10 and the reference signal S3, and the phase difference between the signal envelope S20 and the reference signal S3.

An inclination measurement signal Ss indicative of the inclination can be obtained by means of an adder circuit 122 for adding the output signals of the phase detectors 88' and 88". The inclination measurement signal Ss can be used for monitoring and/or controlling the direction of the scanning path 15 relative to the direction of the tracks 75. To control the direction of the scanning path 16, the circuit shown in FIG. 8 may be provided with a control circuit which is responsive to the inclination measurement signal Ss to drive an actuator 124 by means of which the direction of the scanning path 16 can be adjusted. Such an actuator may be of a type which influences the scanning system, for example by changing the orientation of the axis of rotation 17 of the polygonal mirror 5, as described in the afore-mentioned U.S. Pat. No. 4,901,297. However, alternatively the direction of the scanning path 16 can be adjusted by changing the position of the recording surface.

What is claimed is:

1. A scanning device, comprising:

beam generating means for generating a first scanning beam and a second scanning beam for scanning a scanning surface of a record carrier, the first scanning beam and the second scanning beam forming a first scanning spot and a second scanning spot, respectively, on the scanning surface; and scanning spot movement means for causing the first scanning spot and the second scanning spot to scan the scanning surface synchronously along a first scanning path and a second scanning path, respectively, which are non-parallel so that the second scanning spot moves relative to the first scanning spot in a direction transverse to the direction of the first scanning spot and the position of the second scanning spot with respect to the position of the first scanning spot is related to the position of the first scanning spot on the first scanning path.

2. The device as claimed in claim 1, wherein the scanning spot movement means includes a deflection unit which is rotatable about an axis of rotation and has a reflecting surface via which the first scanning beam and the second scanning beam are directed to the scanning surface, the reflecting surface being such that the central axis of the second scanning beam, at the location where this beam impinges on the reflecting surface, is not disposed in a plane perpendicular to the axis of rotation, and the central axis of the first scanning beam, at the location where this beam impinges on the reflecting surface, is not parallel to the central axis of the second scanning beam.

3. The device as claimed in claim 2, wherein the deflection unit includes a polygonal mirror which is rotatable about an axis of rotation and has reflecting facets, the reflecting surface being formed by a facet defined by the position of the polygonal mirror.

4. The device as claimed in claim 3, wherein the facets of the polygonal mirror extend obliquely relative to the axis of rotation.

5. The device as claimed in claim 1, wherein the first scanning path and the second scanning path intersect.

6. The device as claimed in claim 1, wherein the spot movement means operates to cause the first scanning spot and the second scanning spot to repeatedly scan the scanning surface.

7. The device as claimed in claim 1, wherein the beam generating means further generates a third scanning beam which forms a third scanning spot on the scanning surface, and the scanning spot movement means further causes the third scanning spot to scan the scanning surface along a third scanning path, which is non-parallel to the first scanning path, synchronously with the first scanning spot as the first scanning spot scans the scanning surface along the first scanning path so that the third scanning spot moves relative to the first scanning spot in a direction transverse to the direction of the first scanning spot and the position of the third scanning spot with respect to the position of the first scanning spot is related to the position of the first scanning spot on the first scanning path.

8. The device as claimed in claim 7, wherein the second scanning spot and the third scanning spot are situated symmetrically relative to the first scanning spot.

9. The device as claimed in claim 7, wherein the spot movement means operates to cause the first scanning spot, the second scanning spot and the third scanning spot to repeatedly scan the scanning surface.

10. The device as claimed in claim 7, wherein the second scanning path and the third scanning path are non-parallel and symmetrical.

11. The device as claimed in claim 10, wherein the second scanning path and the third scanning path intersect.

12. The device as claimed in claim 11, wherein the second scanning path and the third scanning path interest the first scanning path.

13. A read and/or record apparatus for reading and/or recording information from and/or in tracks of a scanning surface of a record carrier, the apparatus comprising:

a scanning device including:

beam generating means for generating a first scanning beam for scanning the scanning surface to read and/or recording information from and/or in the tracks of the scanning surface and a second scanning beam for scanning the scanning surface to provide information for use in monitoring the reading and/or recording, the first scanning beam and the second scanning beam forming a first scanning spot and a second scanning spot, respectively, on the scanning surface; and scanning spot movement means for causing the first scanning spot and the second scanning spot to scan the scanning surface synchronously along a first scanning path and a second scanning path, respectively, which are non-parallel so that the second scanning spot moves relative to the first scanning spot in a direction transverse to the direction of the first scanning spot and the position of the second scanning spot with respect to the position of the first scanning spot is related to the position of the first scanning spot on the first scanning path, the tracks have a track direction substantially corresponding to the direction of the first scanning path;

detection means for converting radiation emanating from the second scanning spot into a corresponding detection signal; and derivation means for deriving a position measurement signal indicative of deviation of track pitch of the tracks on the basis of a deviation in a relationship between the detection signal and a reference signal indicative of the position of the first scanning spot on the first scanning path.

14. The apparatus as claimed in claim 13, further comprising means for deriving from the detection signal a quality measurement signal indicative of a quality of the tracks traversed by the second scanning spot.

15. The apparatus as claimed in claim 13, further comprising means for moving the scanning surface relative to the scanning device in a given direction of movement.

16. The apparatus as claimed in claim 15, further comprising means for deriving from the detection signal a speed measurement signal indicative of the speed of the first scanning spot in a direction transverse to the track direction on the basis of the period of the detection signal.

17. The apparatus as claimed in claim 13, wherein the derivation means includes shift detection means for determining a shift of the detection signal relative to the reference signal.

18. The apparatus as claimed in claim 17, wherein the shift detection means includes a phase detector for detecting a phase shift between the detection signal and the reference signal.

19. The apparatus as claimed in claim 17, wherein the shift detection means includes a detector for detecting a time shift between the detection signal and the reference signal.

20. A read and/or record apparatus for reading and/or recording information from and/or in tracks of a scanning surface of a record carrier, the apparatus comprising:
a scanning device including:
beam generating means for generating a first scanning beam for scanning the scanning surface to read and/or record information from and/or in the tracks of the scanning surface, and a second scanning beam and a third scanning beam for scanning the scanning surface to provide information for use in monitoring the reading and/or recording, the first scanning beam, the second scanning beam and the third scanning beam forming a first scanning spot, a second scanning spot and a third scanning spot, respectively, on the scanning surface; and
scanning spot movement means for causing the first scanning spot, the second scanning spot and the third scanning spot to scan the scanning surface synchronously along a first scanning path, a second scanning path and a third scanning path, respectively, in which the first scanning path is non-parallel to the second scanning path and the third scanning path so that the second scanning spot and the third scanning spot each moves relative to the first scanning spot in a direction transverse to the direction of the first scanning spot and the position of each of the second scanning spot and the third scanning spot with respect to the position of the first scanning spot is related to the position of the first scanning spot on the first scanning path, the tracks have a track direction substantially corresponding to the direction of the first scanning path;
first detection means for converting radiation emanating from the second scanning spot into a corresponding first detection signal;
second detection means for converting radiation emanating from the third scanning spot into a corresponding second detection signal; and
derivation means for deriving a position measurement signal indicative of deviation of track pitch of the tracks on the basis of a deviation of the first detection signal and/or the second detection signal.

21. The device as claimed in claim 20, wherein the second scanning spot and the third scanning spot are situated symmetrically relative to the first scanning spot.

22. The device as claimed in claim 20, wherein the second scanning path and the third scanning path are non-parallel and symmetrical.

23. A read and/or record apparatus for reading and/or recording information from and/or in tracks of a scanning surface of a record carrier, the apparatus comprising:
a scanning device including
beam generating means for generating a first scanning beam for scanning the scanning surface to read and/or record information from and/or in the tracks of the scanning surface, and a second scanning beam and a third scanning beam for scanning the scanning surface to provide information for use in monitoring the reading and/or recording, the first scanning beam, the second scanning beam and the third scanning beam forming a first scanning spot, a second scanning spot and a third scanning spot, respectively, on the scanning surface; and
scanning spot movement means for causing the first scanning spot, the second scanning spot and the third scanning spot to scan the scanning surface synchronously along a first scanning path, a second scanning path and a third scanning path, respectively, in which the first scanning path is non-parallel to the second scanning path and the third scanning path so that the second scanning spot and the third scanning spot each moves relative to the first scanning spot in a direction transverse to the direction of the first scanning spot and the position of each of the second scanning spot and the third scanning spot with respect to the position of the first scanning spot is related to the position of the first scanning spot on the first scanning path, the tracks have a track direction substantially corresponding to the direction of the first scanning path;
first detection means for converting radiation emanating from the second scanning spot into a corresponding first detection signal;
second detection means for converting radiation emanating from the third scanning spot into a corresponding second detection signal; and
derivation means for deriving from the first detection signal and the second detection signal an inclination measurement signal indicative of the angle between the track direction and the first scanning path on the basis of a combination of a first deviation and a second deviation, the first derivation being a deviation in a relationship between the first detection signal and a reference signal indicative of the position of the first scanning spot on the first scanning path, and the second derivation being a deviation in a relationship between the second detection signal and the reference signal.

24. The device as claimed in claim 23, wherein the second scanning spot and the third scanning spot are situated symmetrically relative to the first scanning spot.

25. The device as claimed in claim 23, wherein the second scanning path and the third scanning path are non-parallel and symmetrical.

26. The apparatus as claimed in claim 23, wherein the derivation means includes first shift detection means for determining a shift between the first detection signal and the reference signal; and second shift detection means for determining a shift between the second detection signal and the reference signal.

27. A scanning device, comprising:
beam generating means for generating a first scanning beam and a second scanning beam for scanning a scanning surface of a record carrier, the first scanning beam and the second scanning beam forming a first scanning spot and a second scanning spot, respectively, on the scanning surface; and
scanning spot movement means for causing the first scanning spot and the second scanning spot to scan the scanning surface synchronously along a first scanning path and a second scanning path, respectively, which are non-parallel.

28. The device as claimed in claim 27, wherein the first scanning spot is used for reading and/or recording information in the scanning track, and the second scanning spot is used to provide information for monitoring reading and/or recording.

29. The device as claimed in claim 27, wherein the first scanning path and the second scanning path intersect.

30. The device as claimed in claim 27, wherein the beam generating means further generates a third scanning beam which forms a third scanning spot on the scanning surface, and the scanning spot movement means further causes the third scanning spot to scan the scanning surface along a third scanning path, which is non-parallel to the first scanning path, synchronously with the first scanning spot as the first scanning spot scans scanning surface along the first scanning path.

31. The device as claimed in claim 30, wherein the first scanning spot is used for reading and/or recording information in the scanning track, and the second scanning spot and/or third scanning spot is used to provide information for monitoring reading and/or recording.

32. The device as claimed in claim 30, wherein the second scanning path and the third scanning path are symmetrical and intersect.

33. The device as claimed in claim 30, wherein the second scanning path and the third scanning path are non-parallel and symmetrical.

34. The device as claimed in claim 33, wherein the second scanning path and the third scanning path intersect.

35. The device as claimed in claim 34, wherein the second scanning path and the third scanning path interest the first scanning path.

* * * * *